US008904554B2

(12) United States Patent
Shelton

(10) Patent No.: US 8,904,554 B2
(45) Date of Patent: Dec. 2, 2014

(54) SYSTEM AND METHOD FOR SELECTIVELY REDACTING INFORMATION IN ELECTRONIC DOCUMENTS

(75) Inventor: Robert Shelton, Irvine, CA (US)

(73) Assignee: Private Access, Inc., Irvine, CA (US)

(*) Notice: Subject to any disclaimer, the term of this patent is extended or adjusted under 35 U.S.C. 154(b) by 594 days.

(21) Appl. No.: 13/075,344

(22) Filed: Mar. 30, 2011

(65) Prior Publication Data

US 2011/0247081 A1  Oct. 6, 2011

Related U.S. Application Data

(60) Provisional application No. 61/318,873, filed on Mar. 30, 2010.

(51) Int. Cl.
*H04N 7/16* (2011.01)
*G06F 7/00* (2006.01)
*G06F 21/62* (2013.01)

(52) U.S. Cl.
CPC .... *G06F 21/6218* (2013.01); *G06F 2221/2149* (2013.01); *G06F 2221/2141* (2013.01)
USPC ............................................. 726/28; 707/102

(58) Field of Classification Search
CPC . G06F 21/10; G06F 2221/2107; G06F 21/31; G06F 21/6218; G06F 2221/2149; G06F 2221/2141; G11B 20/00086; G11B 20/0021; H04L 63/102; H04L 9/08
USPC ........ 726/28, 2, 24, 27, 29; 382/218; 707/102
See application file for complete search history.

(56) References Cited

U.S. PATENT DOCUMENTS

| | | | | |
|---|---|---|---|---|
| 5,933,498 | A * | 8/1999 | Schneck et al. | 705/54 |
| 7,596,504 | B2 * | 9/2009 | Hughes et al. | 705/7.17 |
| 8,266,439 | B2 * | 9/2012 | Haber et al. | 713/176 |
| 8,590,034 | B2 * | 11/2013 | Hussain et al. | 726/13 |
| 2003/0163428 | A1 * | 8/2003 | Schneck et al. | 705/51 |
| 2003/0172034 | A1 * | 9/2003 | Schneck et al. | 705/54 |
| 2004/0143584 | A1 * | 7/2004 | Chun et al. | 707/100 |
| 2005/0108688 | A1 * | 5/2005 | Lucovsky et al. | 717/127 |
| 2005/0222861 | A1 * | 10/2005 | Silverman et al. | 705/1 |
| 2005/0262132 | A1 * | 11/2005 | Morita et al. | 707/102 |
| 2006/0178997 | A1 * | 8/2006 | Schneck et al. | 705/50 |
| 2006/0230043 | A1 * | 10/2006 | Sumner-Moore | 707/9 |
| 2006/0277220 | A1 * | 12/2006 | Patrick et al. | 707/200 |
| 2007/0030528 | A1 * | 2/2007 | Quaeler et al. | 358/453 |
| 2007/0033654 | A1 * | 2/2007 | Wilson | 726/27 |
| 2008/0127354 | A1 * | 5/2008 | Carpenter et al. | 726/28 |
| 2008/0155652 | A1 * | 6/2008 | DeBie | 726/2 |
| 2009/0070361 | A1 * | 3/2009 | Haber et al. | 707/102 |
| 2009/0199302 | A1 * | 8/2009 | So et al. | 726/27 |
| 2009/0222673 | A1 * | 9/2009 | Schneck et al. | 713/189 |
| 2010/0146072 | A1 * | 6/2010 | Friedman et al. | 709/217 |

(Continued)

*Primary Examiner* — Abu Sholeman
(74) *Attorney, Agent, or Firm* — John C. Serio; Burns & Levinson LLP

(57) ABSTRACT

A computer implemented system and method is provided for imposing access controls on selective portions of electronic documents by defining data attributes as conditions for access to particular information in a document. Commands from a redactor identify at least one portion of an electronic document to be subject to access control. A set of selectable access control directives defining conditions for accessing the identified portions is presented to the redactor. Access control is imposed on the identified portions in accordance with the defined conditions in response to receiving the selective access control directives.

7 Claims, 18 Drawing Sheets

(56) References Cited

U.S. PATENT DOCUMENTS

| | | |
|---|---|---|
| 2010/0162356 A1* | 6/2010 | Khosravi et al. ............... 726/2 |
| 2010/0241844 A1* | 9/2010 | Hussain et al. ............... 713/150 |
| 2011/0088099 A1* | 4/2011 | Villani et al. ............... 726/27 |
| 2011/0173679 A1* | 7/2011 | Perumal et al. ............... 726/4 |
| 2012/0030243 A1* | 2/2012 | Ishikawa ............... 707/785 |
| 2012/0033892 A1* | 2/2012 | Blenkhorn et al. ............ 382/218 |
| 2012/0059665 A1* | 3/2012 | Miller ............... 705/2 |
| 2012/0089589 A1* | 4/2012 | Tsao ............... 707/707 |
| 2012/0254761 A1* | 10/2012 | DeWitt ............... 715/733 |
| 2012/0296788 A1* | 11/2012 | Hebbar et al. ............... 705/35 |
| 2012/0331567 A1* | 12/2012 | Shelton ............... 726/28 |
| 2012/0331571 A1* | 12/2012 | Vandervort ............... 726/30 |
| 2013/0232543 A1* | 9/2013 | Cheng et al. ............... 726/1 |
| 2013/0268830 A1* | 10/2013 | Khosrowshahi et al. ...... 715/205 |

* cited by examiner

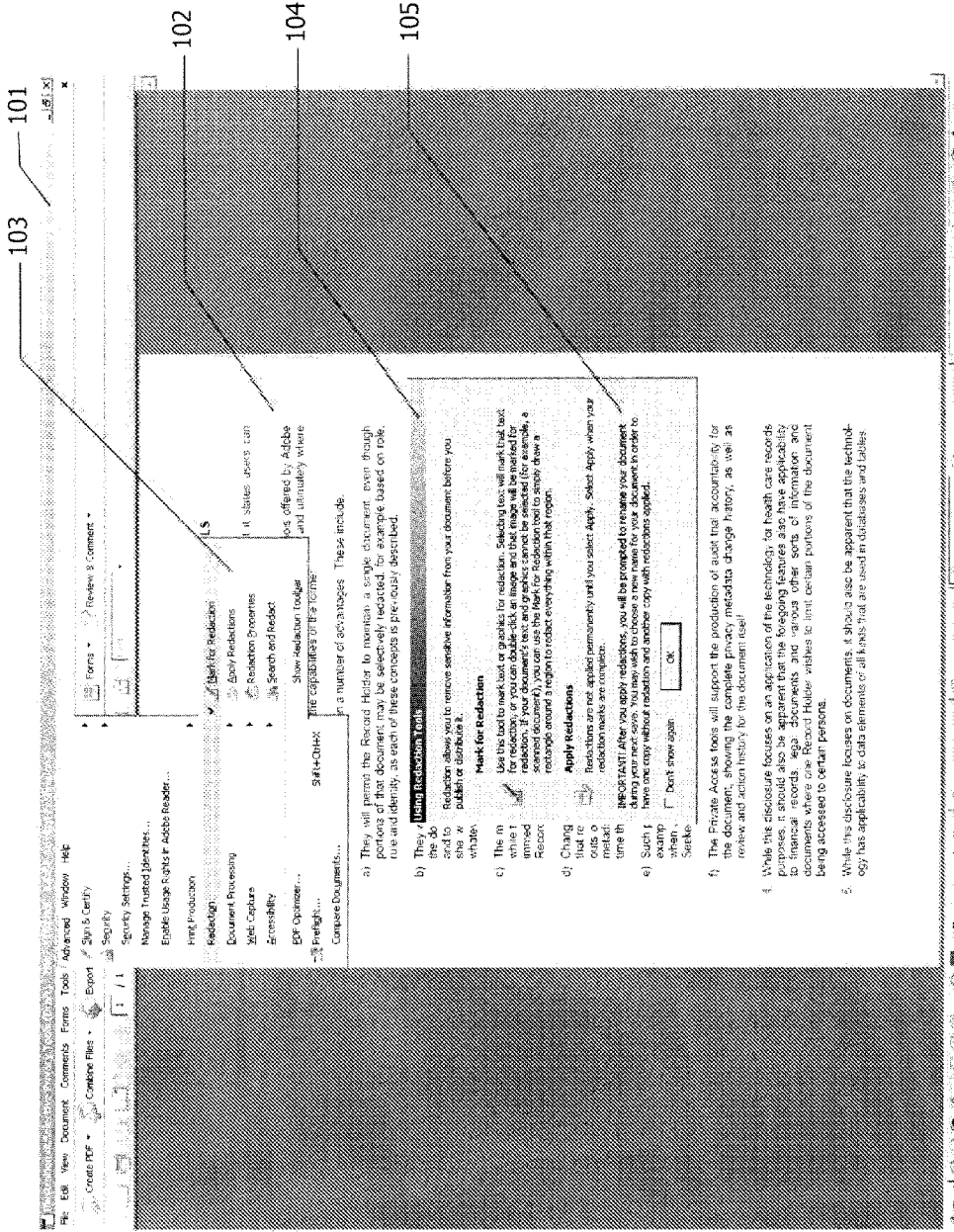
Fig. 1-A (Prior Art)

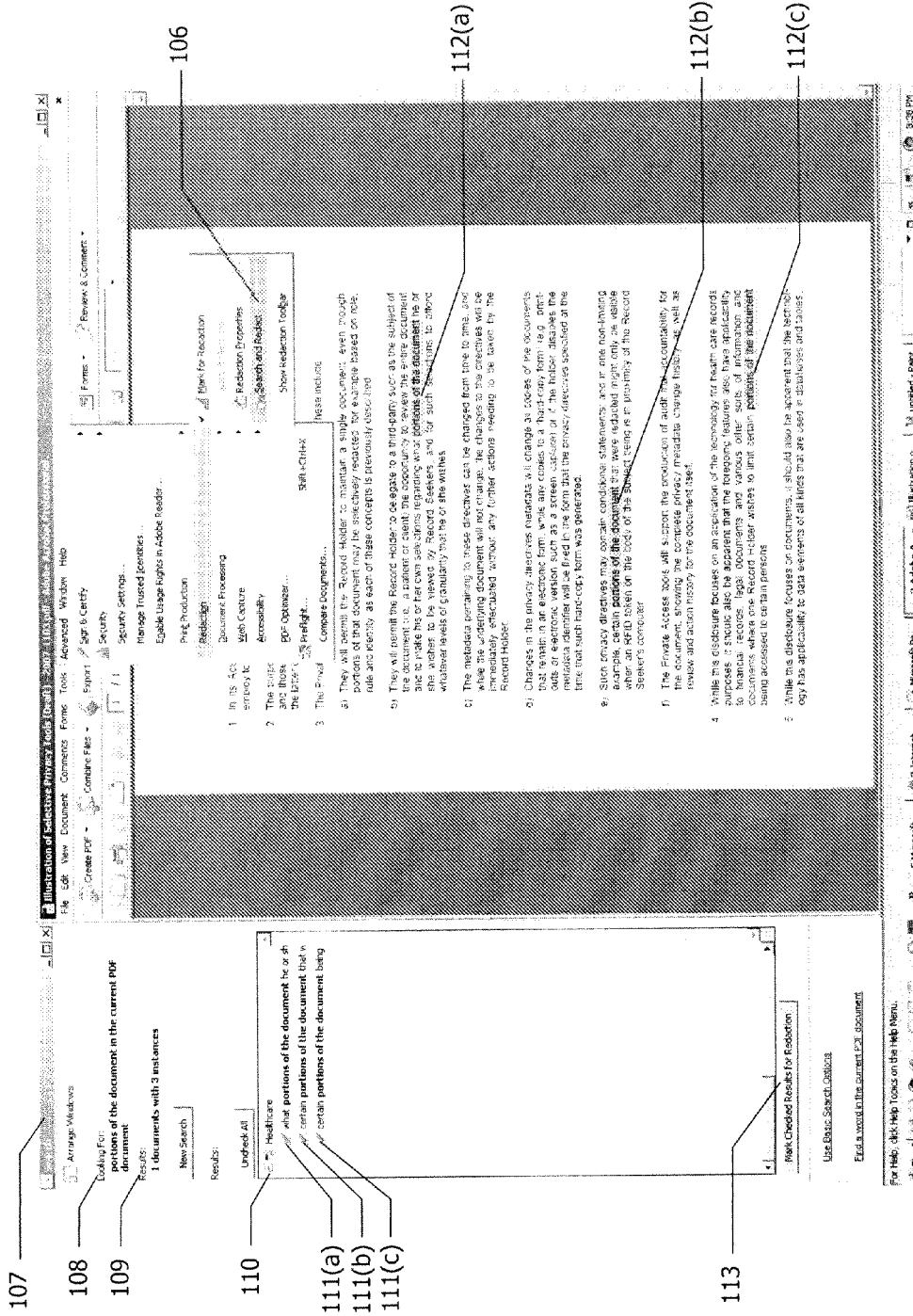
Fig. 1-B
(Prior Art)

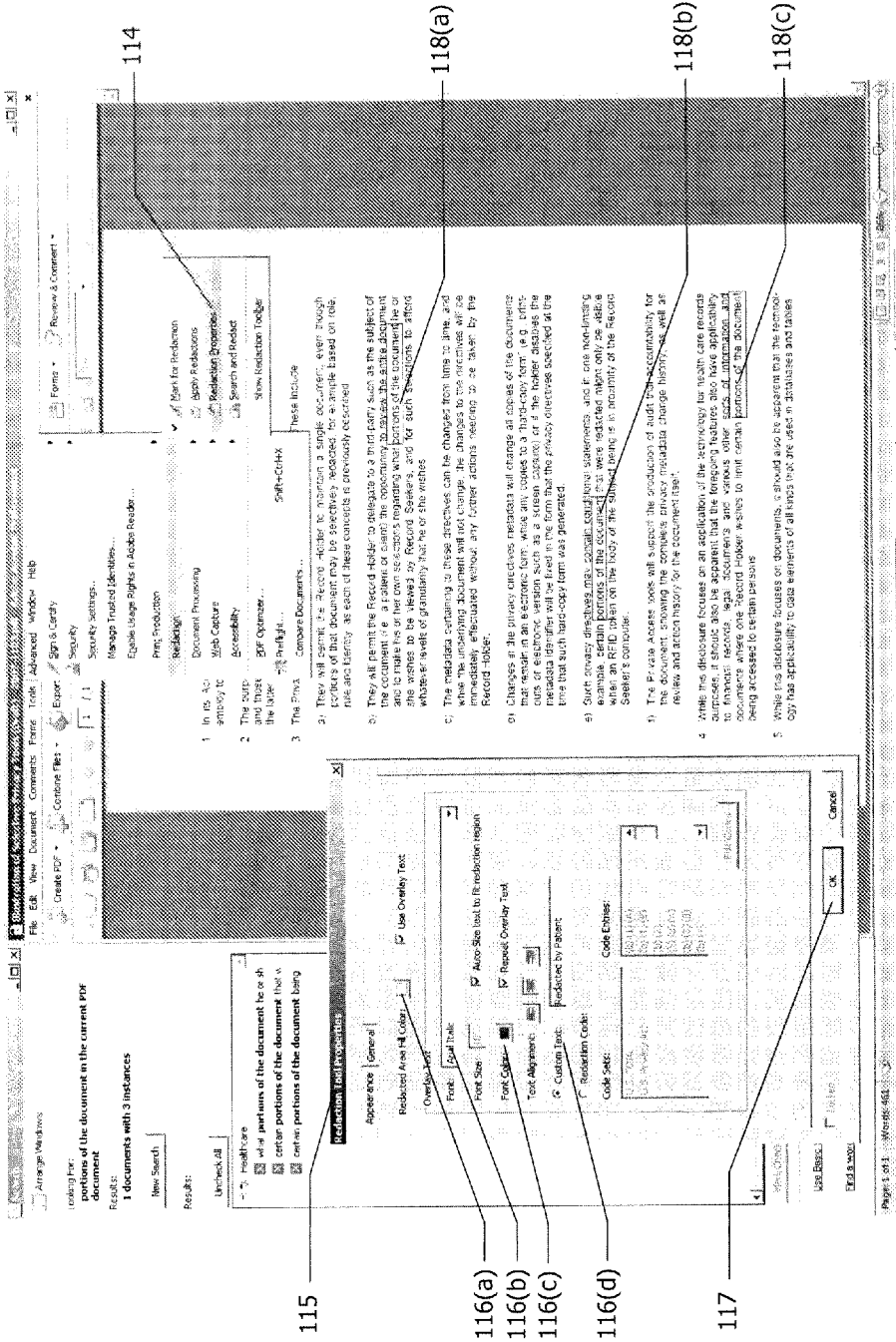
Fig. 1-C (Prior Art)

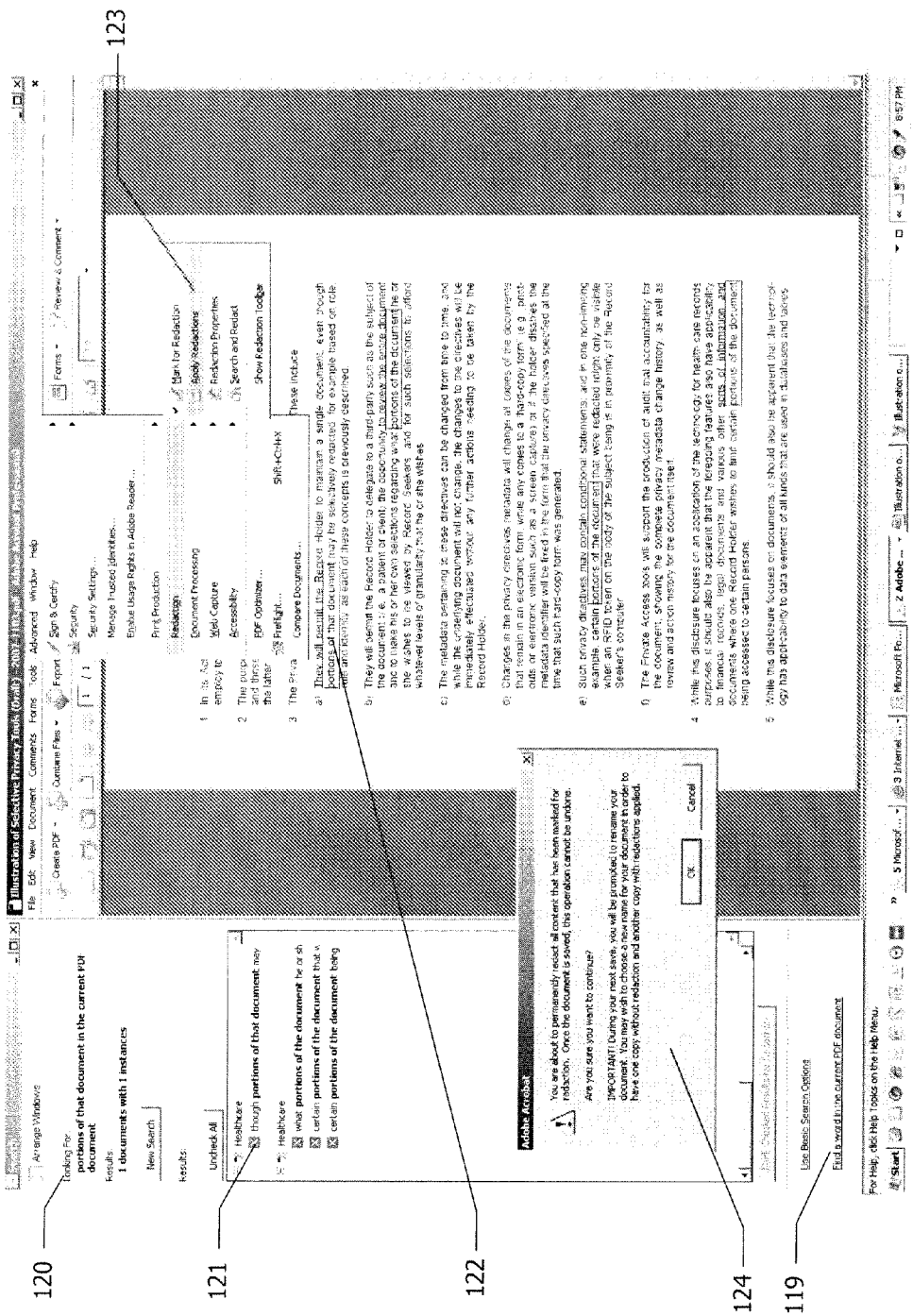
Fig. 1-D (Prior Art)

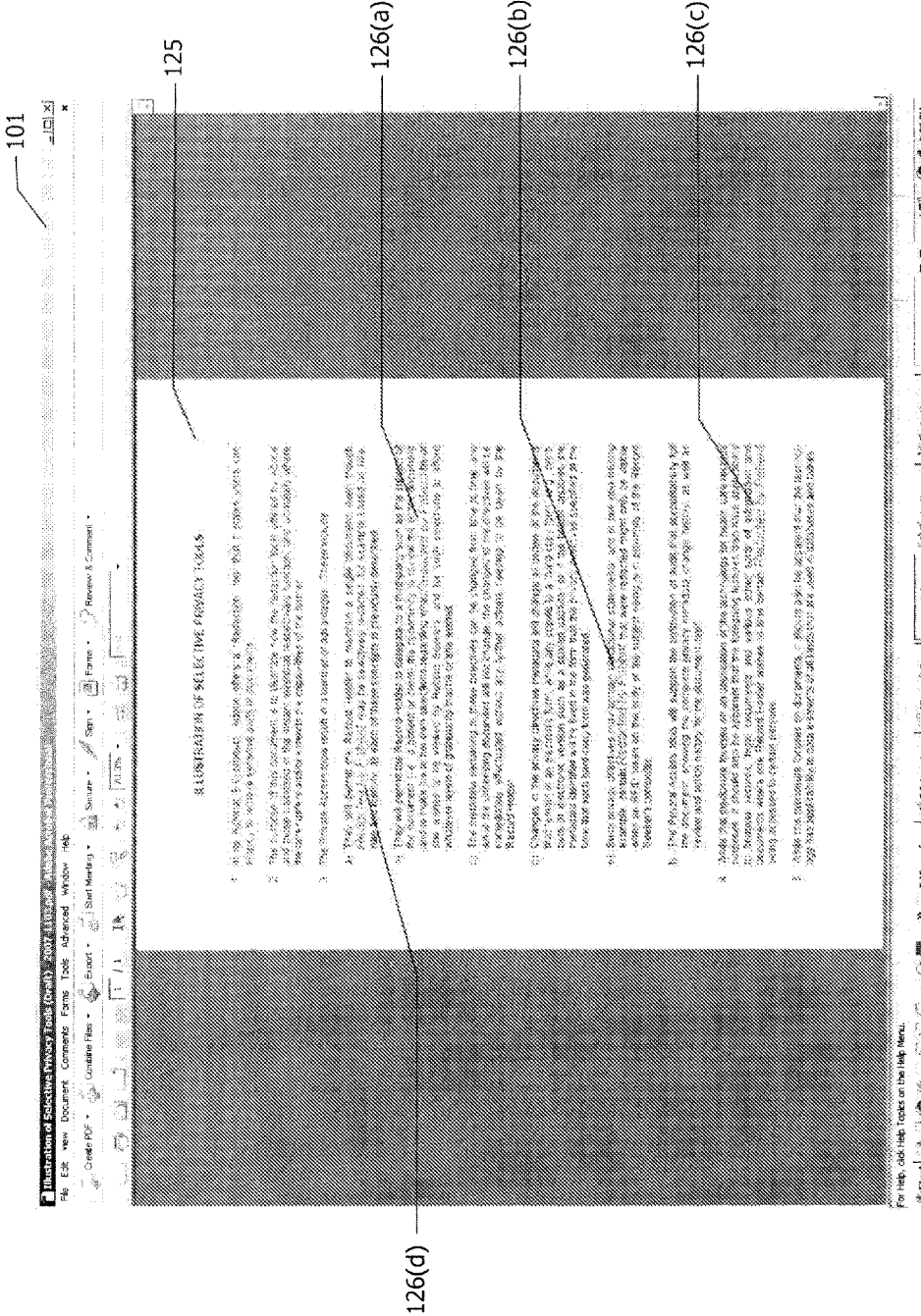
Fig. 1-E
(Prior Art)

Fig. 2-A

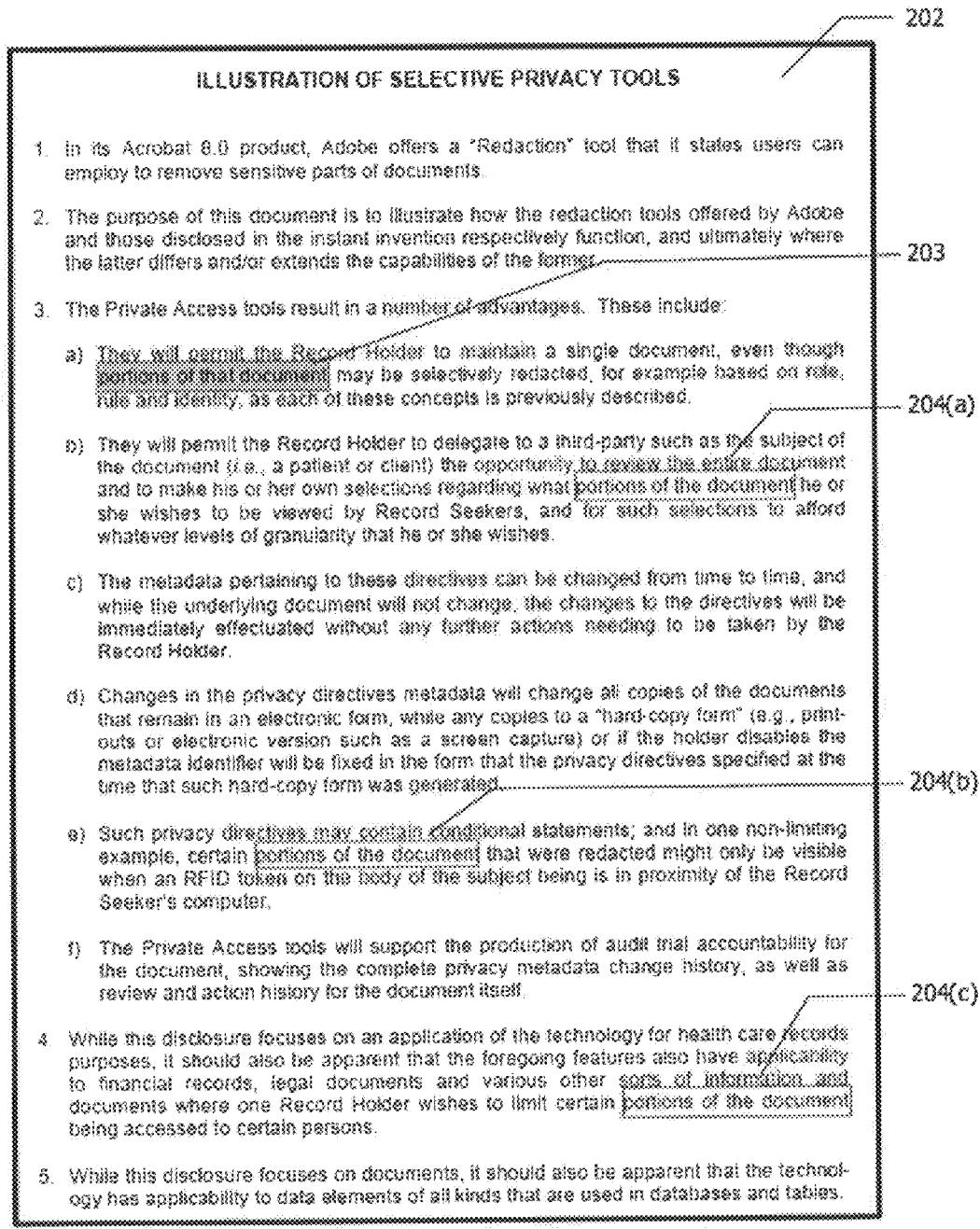
Fig. 2-A(1)

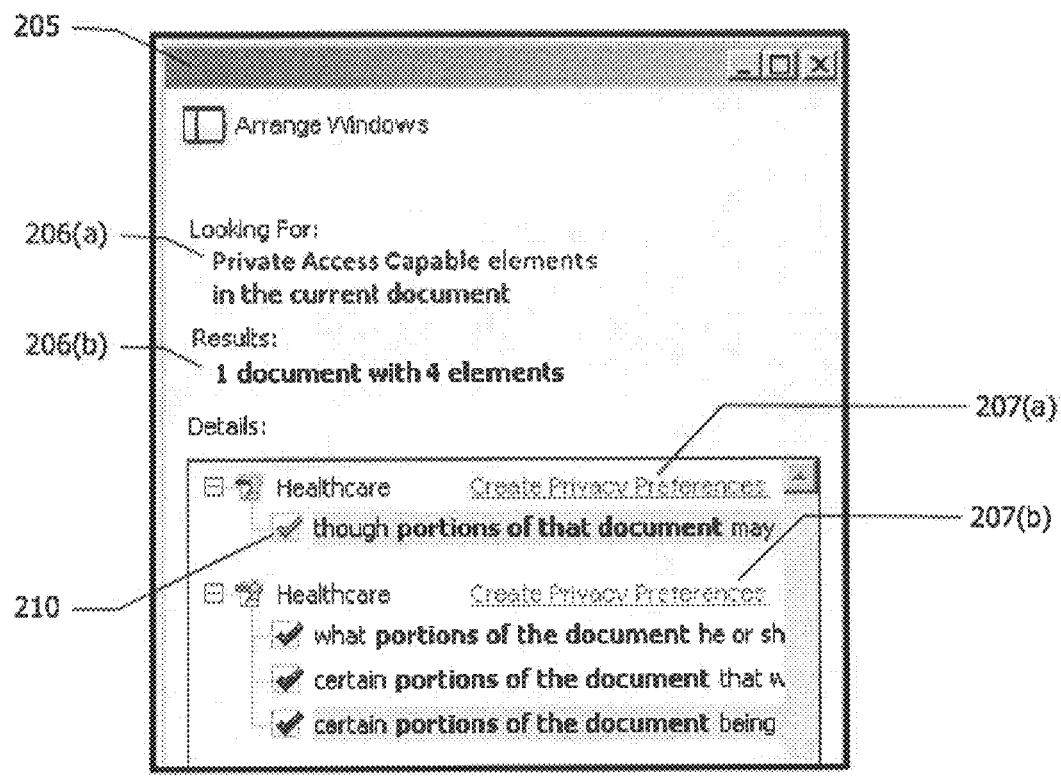
Fig. 2-A(2)

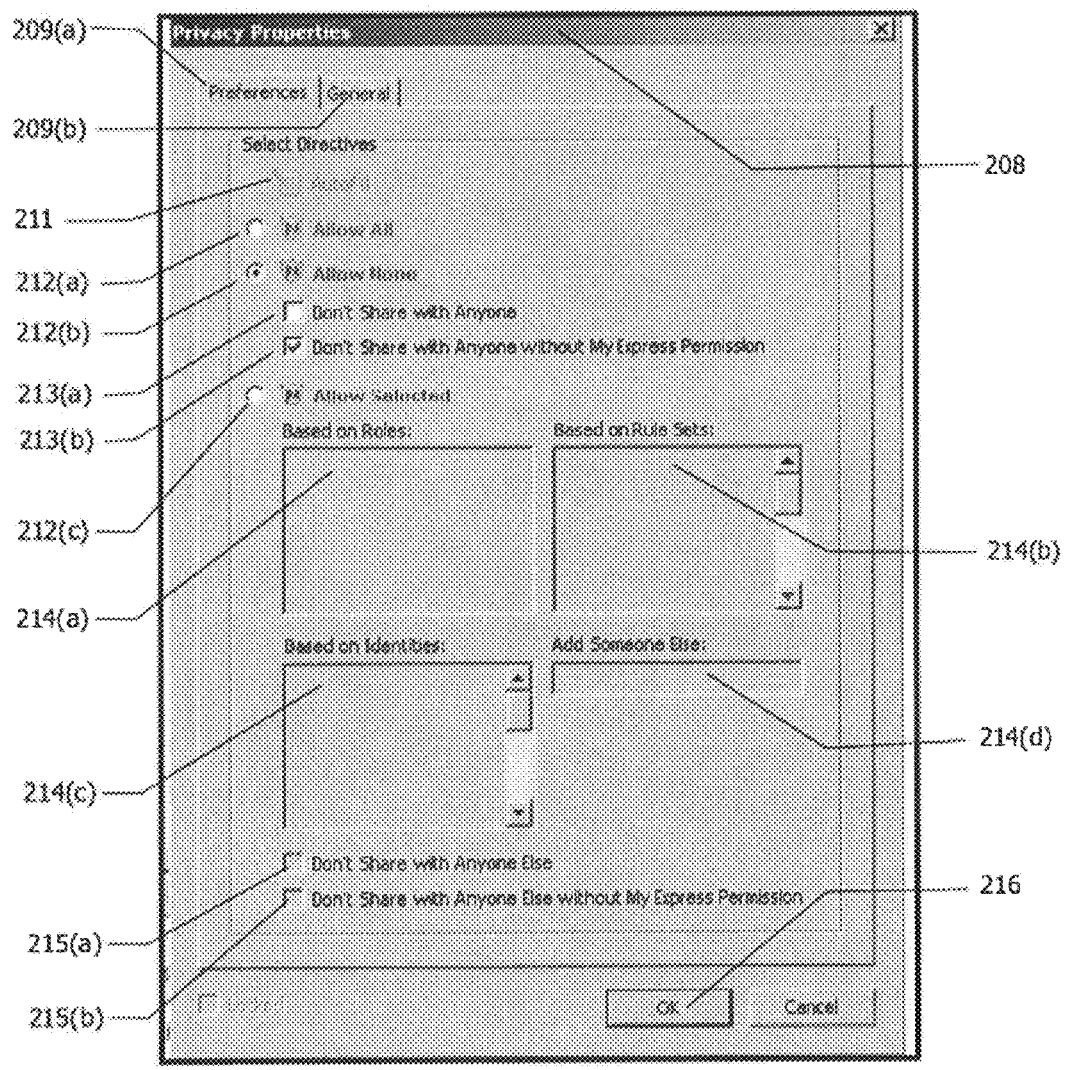
Fig. 2-A(3)

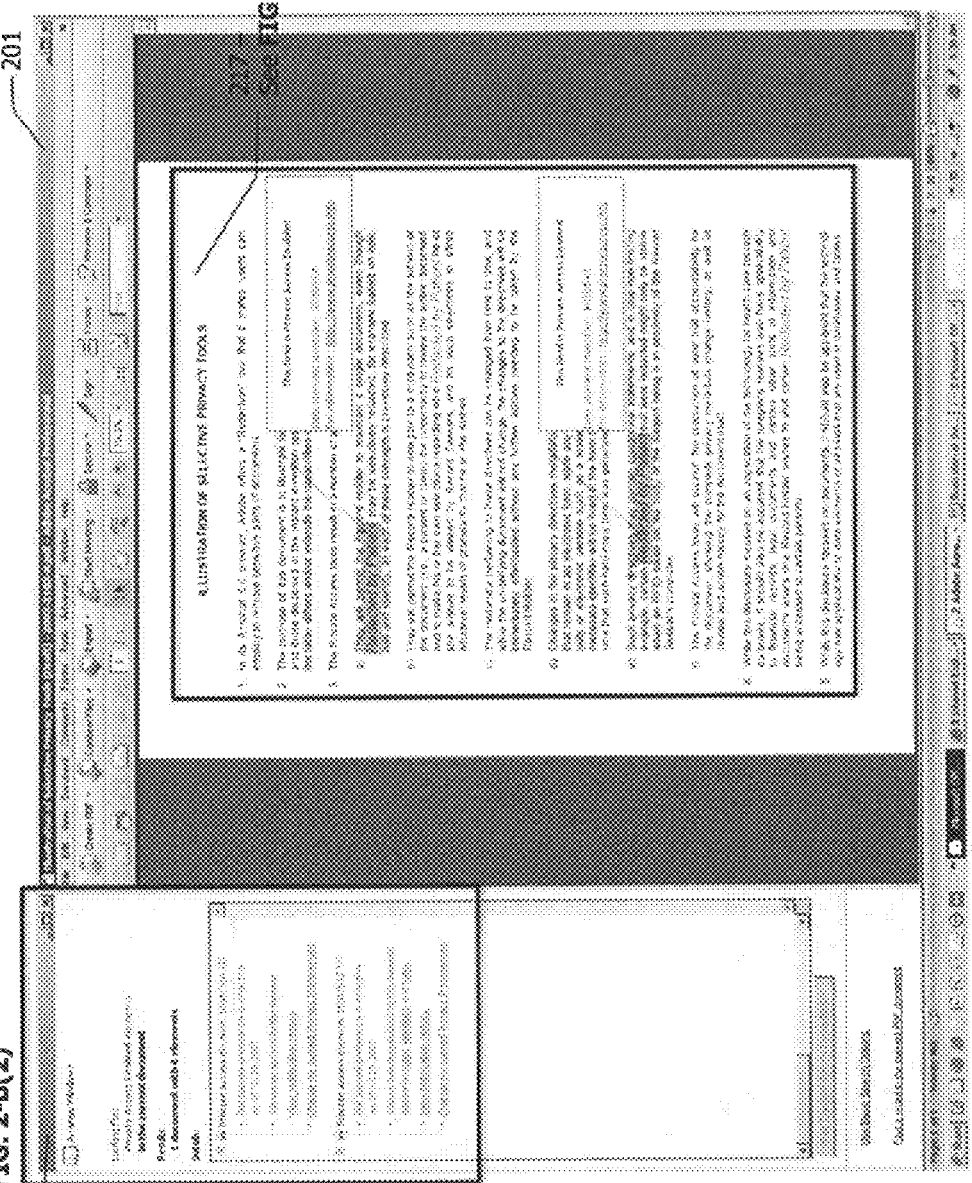
Fig. 2-B

ILLUSTRATION OF SELECTIVE PRIVACY TOOLS — 217

1. In its Acrobat 8.0 product, Adobe offers a "Redaction" tool that it states users can employ to remove sensitive parts of documents.

2. The purpose of this document is to illustrate how [redacted] and those disclosed in the instant invention related [redacted] the latter differs and/or extends the capabilities of [redacted] — 219

*This field is Private Access Enabled*
   Data element identifier: 103USA
   For information : http://www.privateaccess.info 3. The Private Access tools result in a number of [redacted] — 220 a) They will permit the Record Holder to maintain a single document, even though *Redacted by Patient* may be selectively redacted, for example based on role, rule and identity, as each of these concepts is previously described. — 218(a)

b) They will permit the Record Holder to delegate to a third-party such as the subject of the document (i.e., a patient or client) the opportunity to review the entire document and to make his or her own selections regarding what *Redacted by Patient* he or she wishes to be viewed by Record Seekers, and for such selections to afford whatever levels of granularity that he or she wishes. — 218(b)

c) The metadata pertaining to these directives can be changed from time to time, and while the underlying document will not change, the changes to the directives will be immediately effectuated without any further actions needing to be taken by the Record Holder. — 221 d) Changes in the privacy directives metadata that remain in an electronic form, while any outs or electronic version such as a screen [redacted] metadata identifier will be fixed in the form of time that such hard-copy form was generated.

*This field is Private Access Enabled*
   Data element identifier: 103US42
   For information : http://www.privateaccess.info e) Such privacy directives may contain conditional statements; and in one non-limiting example, certain *Redacted by Patient* that were redacted might only be visible when an RFID token on the body of the subject being is in proximity of the Record Seeker's computer. — 222, 218(c)

f) The Private Access tools will support the production of audit trail accountability for the document, showing the complete privacy metadata change history, as well as review and action history for the document itself.

4. While this disclosure focuses on an application of the technology for health care records purposes, it should also be apparent that the foregoing features also have applicability to financial records, legal documents and various other sorts of information and documents where one Record Holder wishes to limit certain *Redacted by Patient* being accessed to certain persons. — 218(d)

5. While this disclosure focuses on documents, it should also be apparent that the technology has applicability to data elements of all kinds that are used in databases and tables.

Fig. 2-B(1)

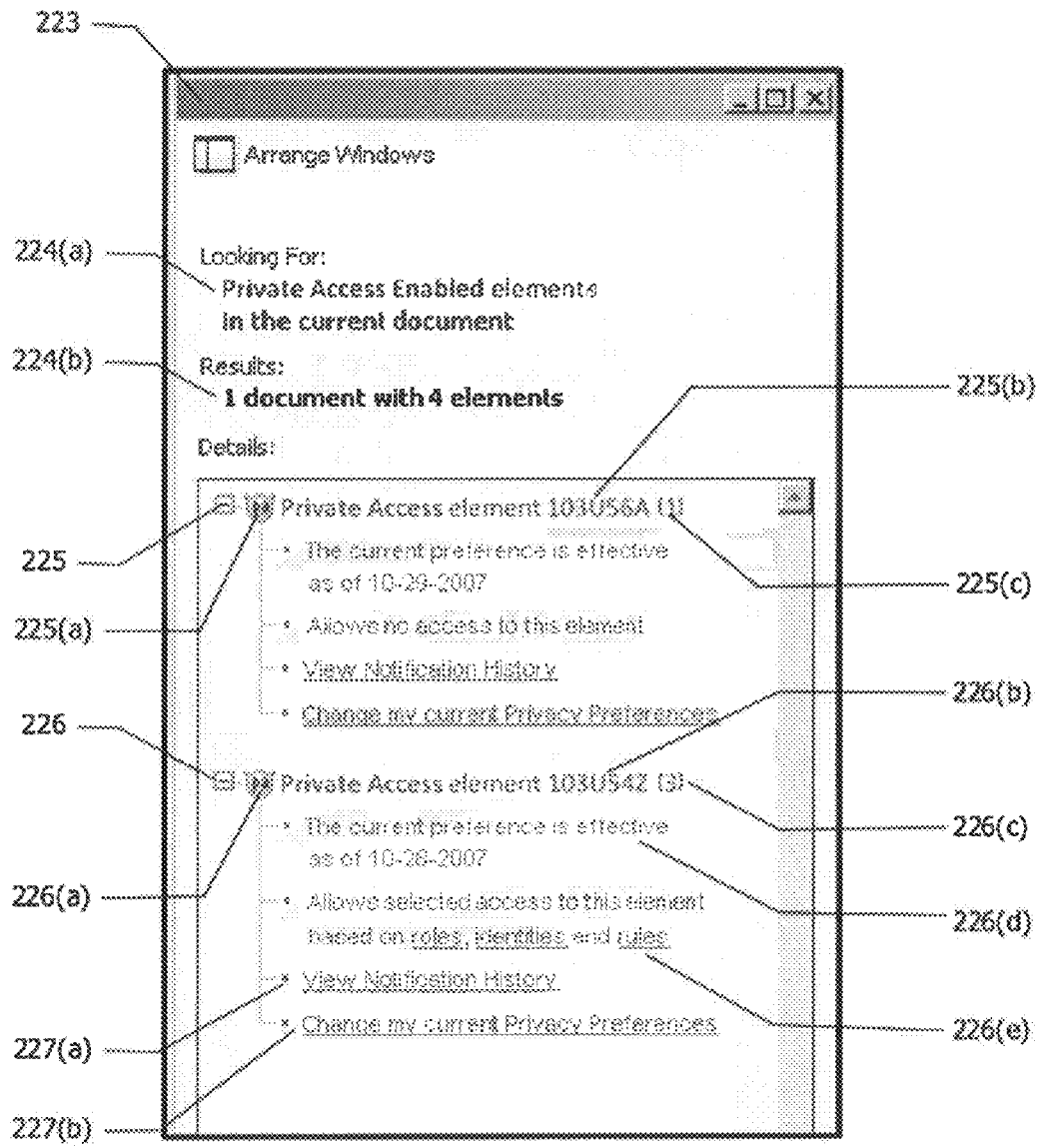
Fig. 2-B(2)

Fig. 2-C

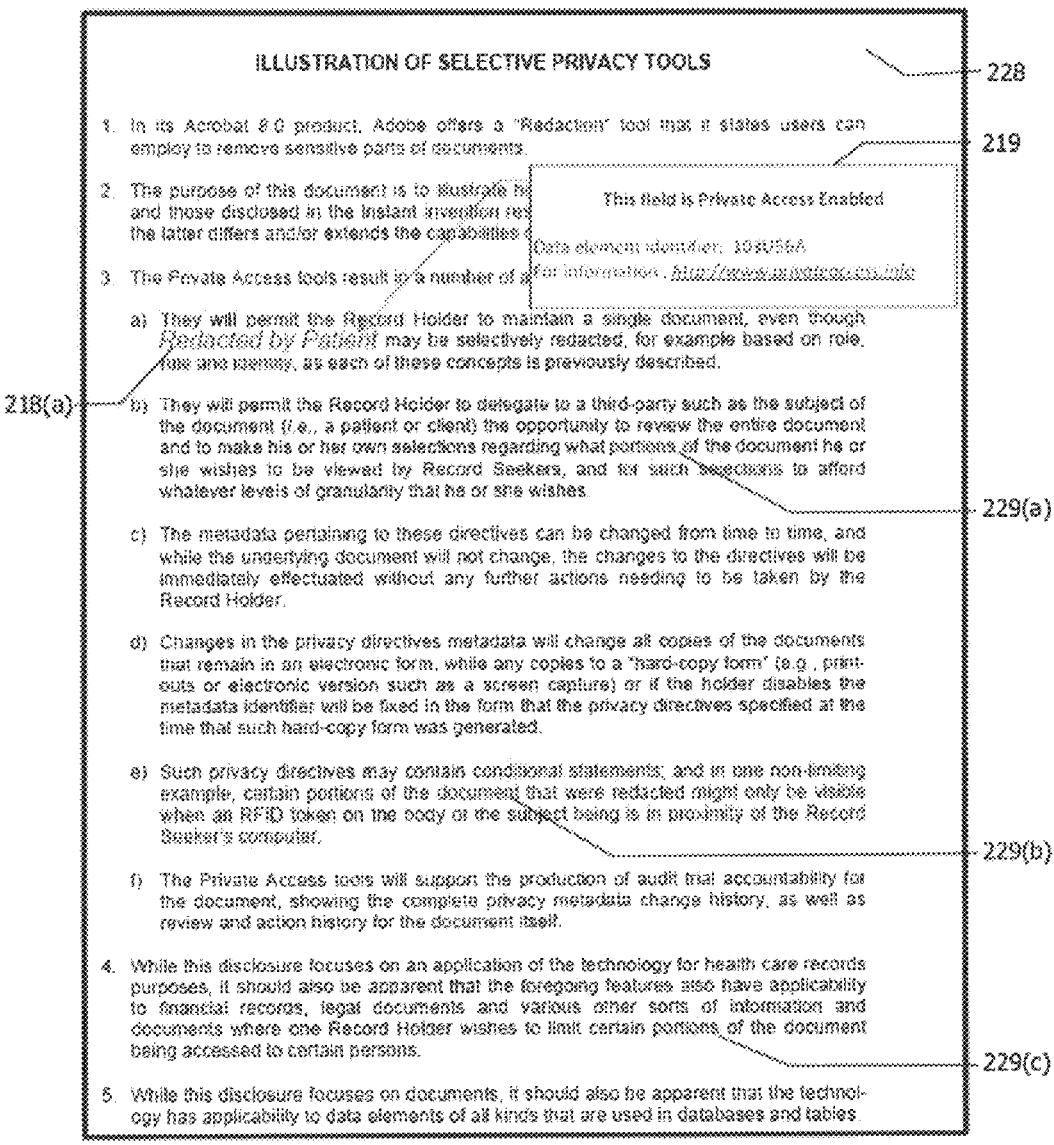
Fig. 2-C(1)

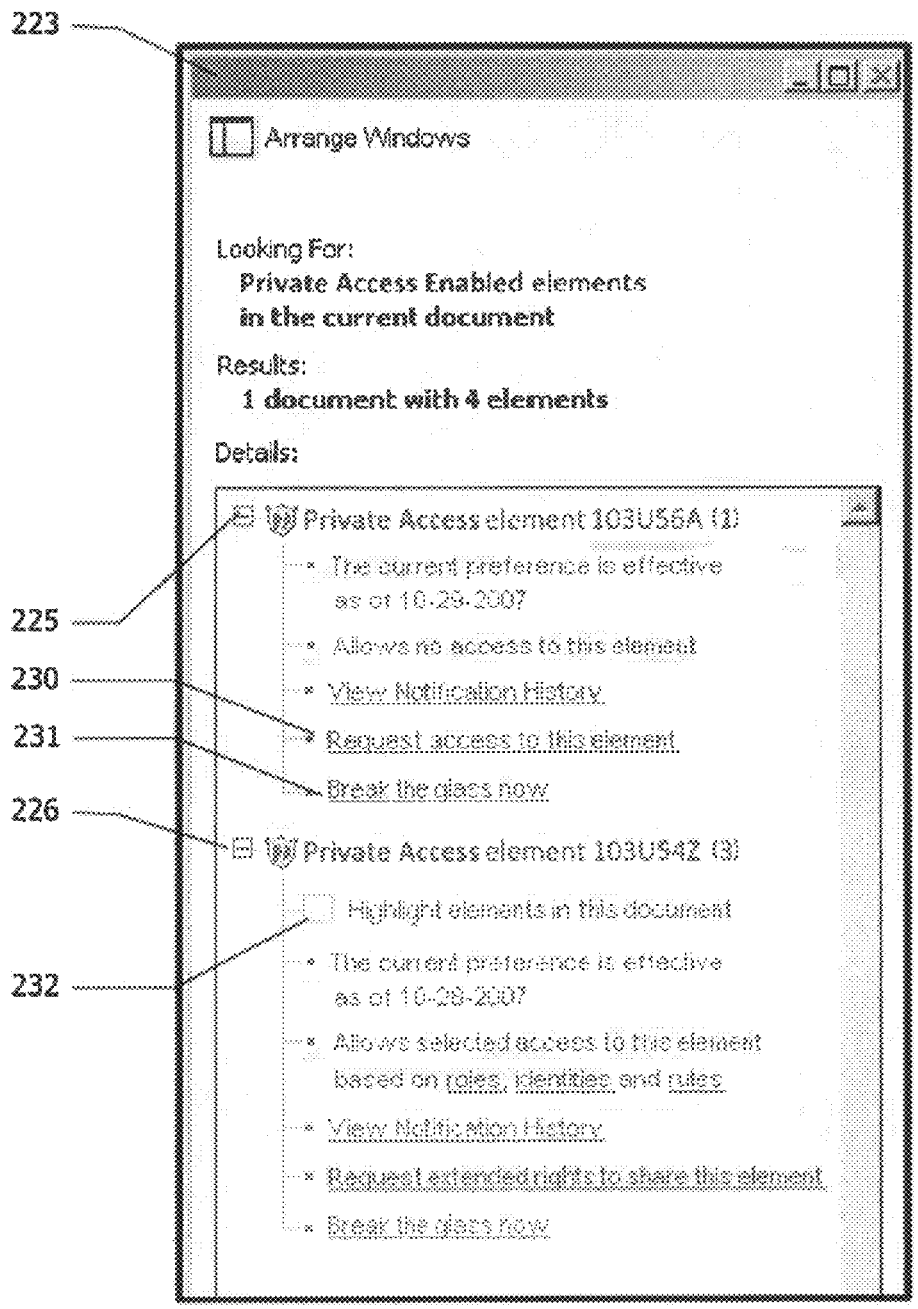
Fig. 2-C(2)

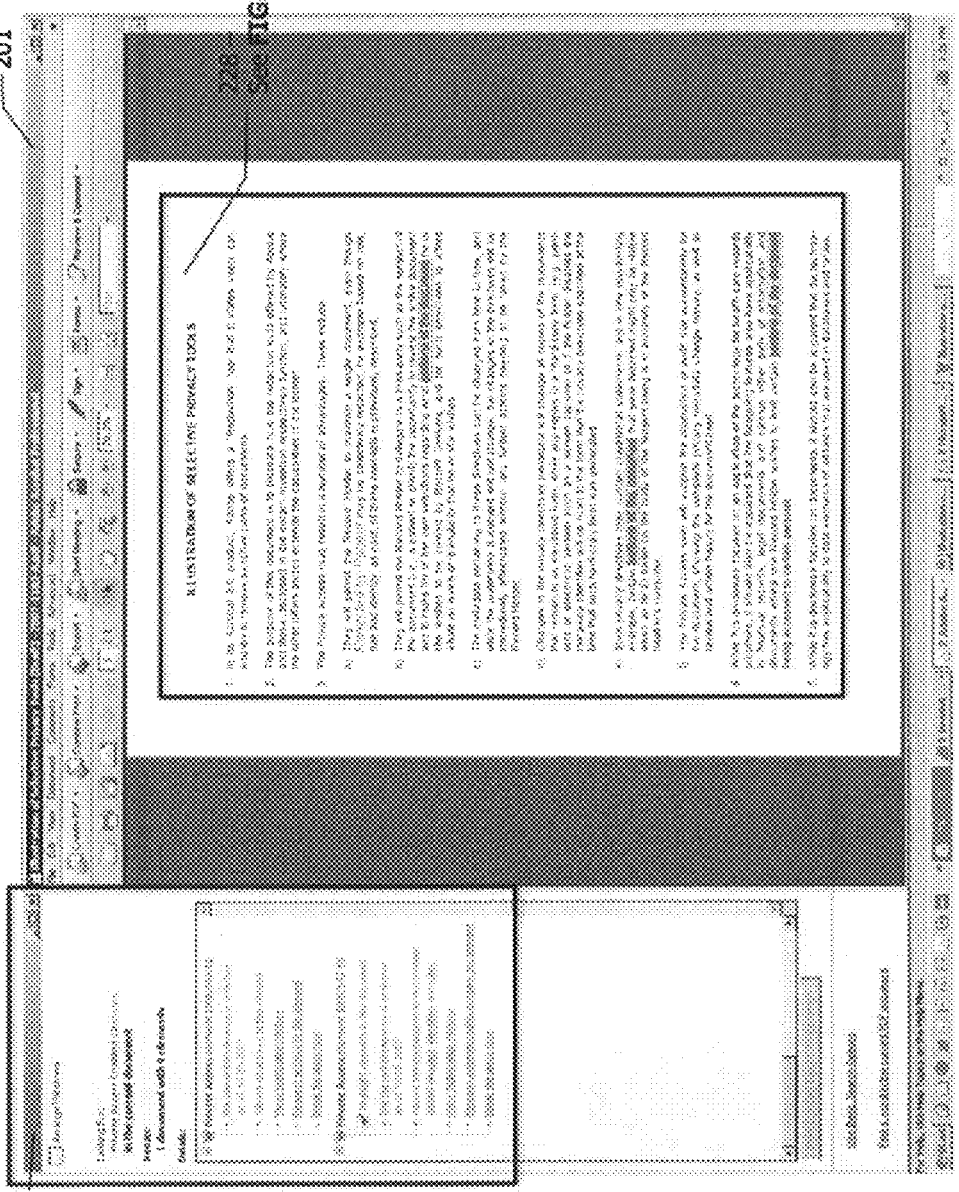
Fig. 2-D

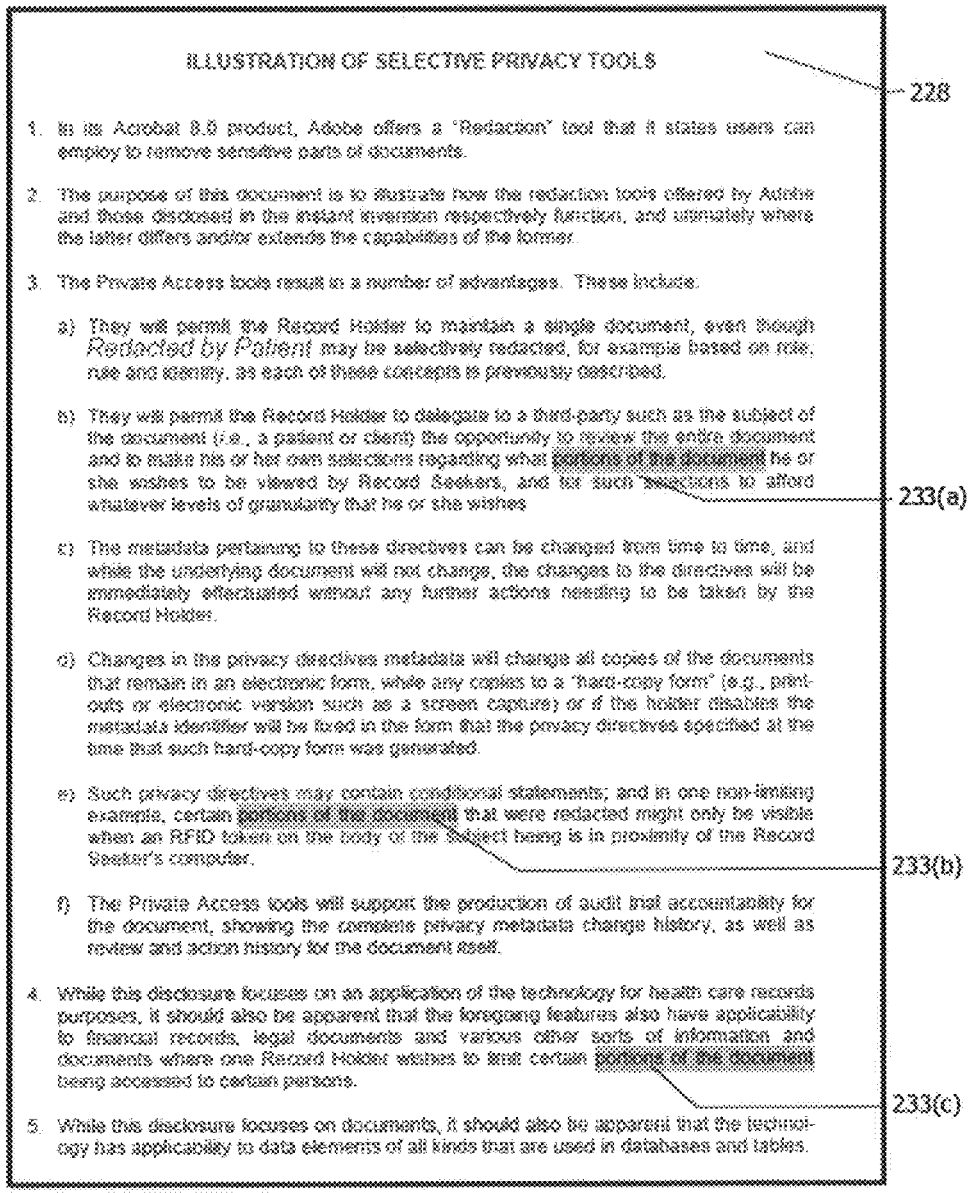
Fig. 2-D(1)

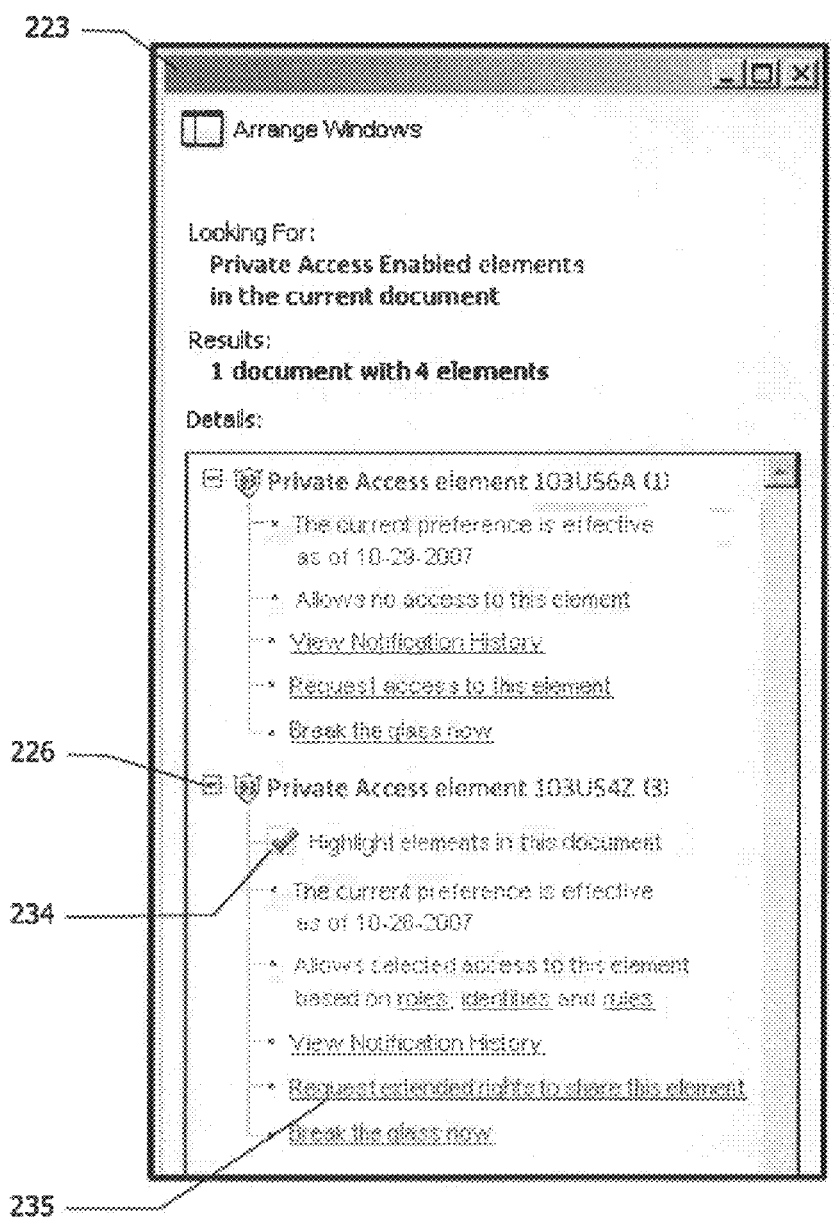
Fig. 2-D(2)

SYSTEM AND METHOD FOR SELECTIVELY REDACTING INFORMATION IN ELECTRONIC DOCUMENTS

CROSS REFERENCE TO RELATED APPLICATIONS

This application claims benefit of U.S. Provisional Application No. 61/318,873 filed on Mar. 30, 2010.

FIELD OF THE INVENTION

The present invention relates to the field of data processing and in particular to the field of access control for electronic documents.

BACKGROUND OF THE INVENTION

Several systems and methods for redacting text from electronic documents are heretofore known. For example, a "Word 2007 Redaction Tool" by Microsoft Corporation of Redland, Wash. can be used to hide text within documents in Microsoft's Office Word document format. Users can mark text to redact and then create a new redacted version of the document in which the marked text is replaced with a black bar that cannot be converted back to the original text. The Word 2007 Redaction Tool works by allowing users to redact a document using a two stage process wherein regions of text which should be redacted are first marked within the document. Then, the marked document is redacted and all marked text is replaced.

A number of other systems provide similar capabilities. For example, both version 9.0 of Adobe Acrobat software by Adobe corporation of San Jose, Calif., as well as the prior version, include "Redaction Tools." The Redaction tools allow permanent removal of visible text and images from files in Adobe Corporation's PDF format. In place of the removed items, redaction marks may appear as colored boxes may be implemented as a blank area. Custom text or redaction codes may be specified to appear over the redaction marks.

FIGS. 1A-1E illustrate the principles of the presently known redaction methods using as an example the aforementioned Acrobat product. FIG. 1A shows a typical application window or browser screen 101 containing an electronic document 102, in which the user presumably wishes to redact certain as yet unspecified text or images. Tools list 103 is opened by various means including, as shown in FIG. 1A, by clicking on "Advanced" and selecting the "Redaction" option from the toolbar in application window 101. In the case of Acrobat, clicking on the redaction tool for the first time opens dialogue box 104, which as shown describes the essential properties of the tool. As noted, the dialogue box description includes warning 105 that underscores the aforementioned permanent nature of the redaction in the present state of the art by reminding the user that she will be prompted to rename the document after she applies the redactions in order to have one copy without redaction and another copy with redactions applied.

Continuing the illustration of previously known redaction tools with FIG. 1B, clicking on the Search option 106 opens a window where the user may search the text of the document to find a particular word or phrase, and which in turn opens Search results window 107. FIG. 1B shows the search results returned in this example when, as explained by notice 108, looking for the phrase "portions of the document". As illustrated by notice 109, this search results in a total of 3 instances in the example, and dialogue box 110 immediately below identifies each of these instances in the present document. Check boxes 111(a) through 111(c), corresponding to highlighted text fields 112(a) through 112(c), respectively, permit the user to select (by the check mark shown) or deselect (by un-checking the corresponding box) each of the times the phrase appears within the document that should be redacted. Once the user is happy with these selections, clicking on button 113 has the effect of marking the checked results for redaction.

FIG. 1C illustrates that in the case of Acrobat, this opens the "Redaction Properties" item 114 on tool list 103, and the corresponding "Redaction Tool Properties" dialogue box 115. As shown therein, the user is permitted to specify the desired properties for the redacted area. Thus, where as indicated above some examples of the present state of the art always return blackened fields, Acrobat permits the user to select a number of options including but not necessarily limited to area fill color 116(a); font 116(b); text color 116(c); and custom text 116(d) to appear within the redacted area. Once the user is comfortable with these settings, she clicks on the acceptance button 117, which will affect areas 118(a) to 118(c) (corresponding to areas 112(a) to 112(c) of FIG. 1B).

Continuing the illustration of previously known redaction tools with FIG. 1-D, clicking on link 119 allows the user to search for additional words and/or phrases in the document, and to repeat the foregoing process. FIG. 1-D shows, for example, the additional search results returned when, as explained by notice 120, looking for the phrase "portions of that document" (contrast with "portions of the document" in case of notice 108 of FIG. 1B), returns one additional instance 121, corresponding to marked text field 122. Once the user is satisfied that all of the desired portions of the document have been identified, she may click on the "Apply Redactions" item 123 on tool list 103. As shown, this action opens the warning dialogue box 124, reminding the user that this will permanently redact all of the marked areas and that once the document has been saved, the operation cannot be undone.

FIG. 1E shows the result of proceeding, which is accomplished by the user clicking on the "OK" button (in dialogue box 124 of FIG. 1D). As shown in this illustration, application window or browser screen 101 now contains a redacted version 125 of electronic document 102 of FIG. 1A, and incorporates the redaction properties specified in dialogue box 115 of FIG. 1C. As shown therein, redaction labels 126(a) through 126(c) now appear, respectively, in place of marked text fields 118(a) to 118(c) shown on FIG. 1C; and redaction label 126(d) now appears in place of marked text field 122 shown on FIG. 1D.

The redacted document 125 has the advantage of being permanently changed, thereby making it impossible for a recipient to recover the original text of the predecessor electronic document 102. This attribute of the redacted portions of the original electronic document being impossible for a recipient to recover has a number of applications, including without limitation in a legal, regulatory and agency context.

For example, ethics rules require attorneys to zealously guard the confidentiality of clients. Violations of this responsibility may result in civil and, in some instances, criminal penalties. Further, contractual obligations may be imposed on the recipient of confidential information. Violations of the contractual obligations may result in substantial damages. Government agencies and administrative departments also have a responsibility to protect state secrets in declassified documents. Additionally, a variety of state and federal regulatory requirements prevent disclosure of confidential information.

One such regulatory context is in the healthcare field. For example, the Health Insurance Portability and Accountability Act of 1996 (HIPAA) and recently enacted Health Information Technology for Economic and Clinical Health (HITECH) provisions of the American Recovery and Reinvestment Act (ARRA) obligate holders of confidential medical information to prevent disclosure of certain personally-identifiable information and other confidential information without the express authorization of the subject (e.g., the patient).

The inability of a recipient to recover redacted information in electronic documents that had been redacted using heretofore known redaction systems and methods presents a number of disadvantages. For example, certain obligations of confidentiality are often limited by a time period, after which the previously confidential portions of such documents are no longer subject to such restrictions. In another example, it may become useful for the party who originally imposed the confidentiality obligations to relieve some or all of the recipients of some portion or all of such limitations. This is particularly apparent in the case of confidential health information where, for example, a patient may indicate that all of their records be kept confidential but may elect to grant rights to selected parties such as medical specialists or care-takers to have access to some portion or all of such information for the period during which the patient is in such person's care.

In each of such examples, it would be preferable if the individual entitled to impose such confidentiality requirements were able to control access to their respective confidential data by defining data attributes thereto.

SUMMARY OF THE INVENTION

Illustrative embodiments of the present invention provide a computer implemented system and method for imposing access controls on selective portions of electronic documents by defining data attributes as conditions for access to particular data in a document. An illustrative embodiment of the inventive method includes the steps of receiving a command from a redactor identifying at least one portion of an electronic document to be subject to access control and presenting a set of selectable access control directives defining conditions for access the identified portions to the redactor. Access control is automatically imposed upon the identified portions in accordance with the defined conditions in response to one receiving the selective access control directives.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIGS. 1A-1E are screen shot representations of a user interface used for redacting information in electronic documents according to the Prior Art; and FIGS. 2A-2D are screen shot representations of a user interface used for selectively redacting information from electronic document using defined data attributes according to an illustrative embodiments of the present invention.

DETAILED DESCRIPTION

Figure 2:
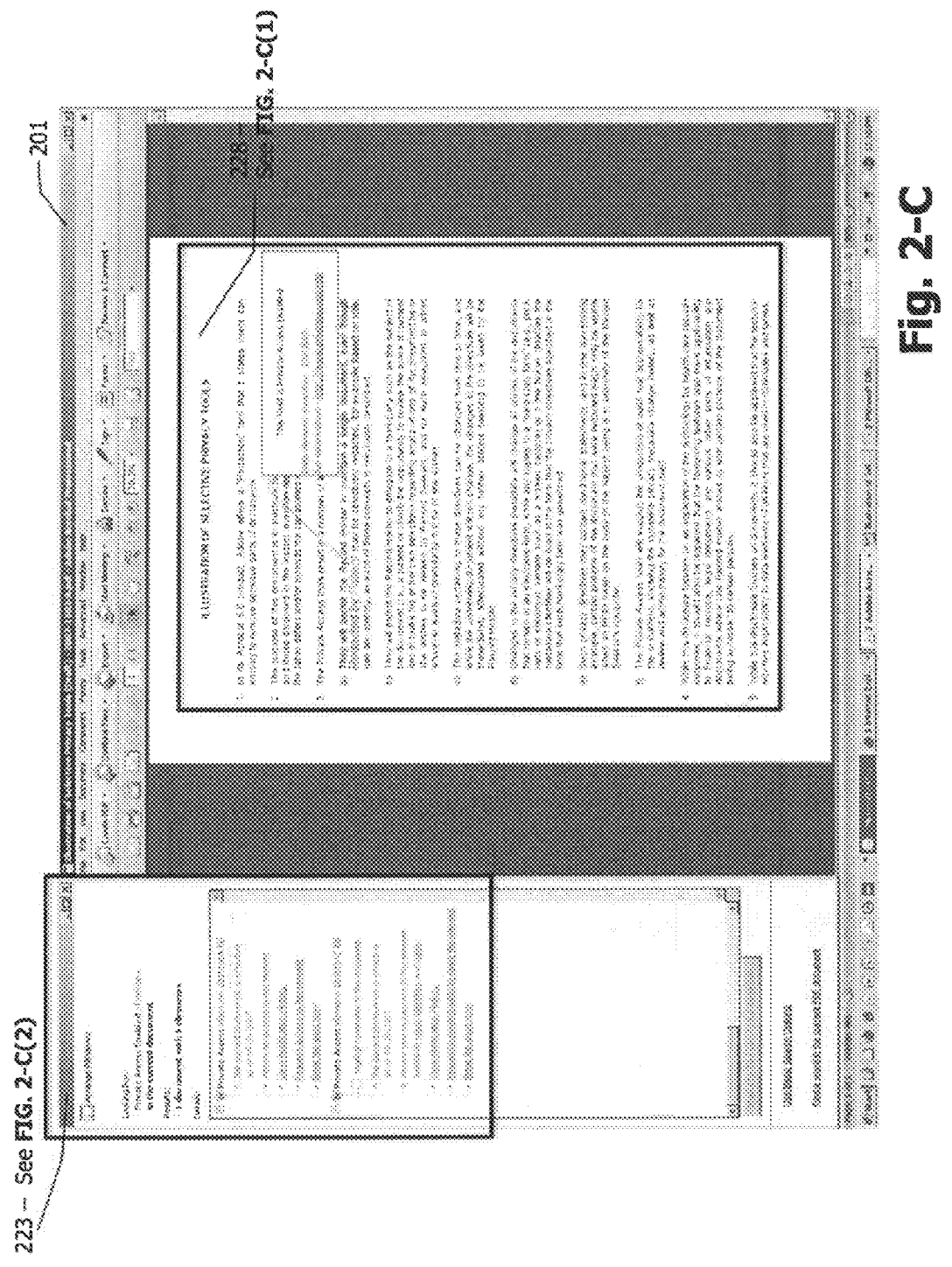

FIG. 2, comprised of parts A-D, illustrates the principles of one illustrative embodiment of the invention in which the contents of an electronic document are able to be selectively redacted using the system. FIG. 2-A illustrates the starting point, wherein the portions of the document that the user wishes to control have been identified. Persons of ordinary skill in the art will readily appreciate that this may be accomplished in a variety of ways within the scope of the present invention.

Browser screen 201 is a typical browser screen containing an electronic document 202, in which the user has identified elements 203 and 204(a) through 204(c) for selective privacy controls. Tools window 205 is opened by various means, including by selecting a "Privacy Tools" option from the toolbar in browser 201. Alternatively, where the invention is provided as an add-in utility or enhancement to an existing application such as Acrobat, MS Word or the like, tools window 205 may be an additional feature of a previously available tools list such as item 103 of FIG. 1A, or of a previously available search results window such as item 107 of FIG. 1B.

Messages 206(a) and 206(b) respectively indicate that the contents of tools window 205 are the elements of electronic document 202 that are capable of receiving selective privacy directives. In this illustration, this quality of various elements in the document (or multiple documents) being subject to an individual such as a patient imposing access controls by defining data attributes as conditions for access to particular confidential data in the document(s) is referred to as being a "Private Access Capable" element. Thus as illustrated in FIG. 2A, the search described in message 206(a) for Private Access Capable elements that was conducted by this user reveals in message 206(b) one document with a total of four elements.

Hypertext links 207(a) and 207(b), each entitled "Create Privacy Preferences," provide access to the dialogue box for creating and attaching the desired privacy preference directives to the portions of the document listed there under, for which the user wishes to establish privacy and access controls. Thus, by clicking on hypertext link 207(a), the user opens dialogue box 208, entitled "Privacy Properties". The Privacy Properties dialogue box 208 consists of two tabbed sections: 209(a) that permits the user to create his or her preferences, and 209(b) that contains the general privacy related information applicable to this document.

Tabbed section 209(a) permits the user to establish the privacy directives that will apply to any element associated with hypertext link 207(a) for which there is a checkmark, such as in check box 210, and which is correspondingly highlighted in window 201, as highlighted field 203. In one illustrative embodiment, the default settings for the redaction directive would be those established for the document as a whole. Thus, for example, these settings may be reflected in the Privacy Settings dialogue window by clicking on the AutoFill button 211. Alternatively, in a illustrative embodiment, the user may manually set the applicable privacy and access controls by selecting one of option 212(a) to allow the record holder to share all of the contents of the document with anyone; option 212(b) to inform the record holder that the user wishes for him or her to allow none of these contents to be shared with anyone; and option 212(c) to allow selective privacy preferences.

As illustrated in FIG. 2A, the user has selected option 212(b) to indicate that the data element beside check box 210 should not be shared with anyone. In one illustrative embodiment, the user is able to indicate by placing a mark in checkbox 213(a) or 213(b) whether she wishes to leave open the possibility of granting express permissions when presented with this option. FIG. 2-A illustrates that this user has selected option 213(b), requiring express permission, meaning that the user is specifying that the record holder should not allow anyone access to the specific redacted element 203 without first securing her express permission.

Although FIG. 2A does not illustrate the selection of this option, had the user selected option 212(c), then she would have been able to establish her privacy preferences based on rules, roles and identities, preferably from normalized or pre-populated lists, by filling out the information in data fields 214(a) to 214(c), respectively. In a illustrative embodiment, each of these fields would be pre-populated with the selections made by this user for his or her privacy preferences. Data field 214(d) additionally permits the user to designate one or more other persons whom she wishes to be granted access to this data element, and for whom there is not a normalized data selection present.

As described above in relation to selection 212(a), in a illustrative embodiment, the user is also given the option of indicating whether she is open to receiving requests from the record holder in the event access is sought for someone who is not covered by the rule- or role-designations and/or who is not already expressly identified by the user. This selection, when appropriate, is made by placing a mark in the corresponding checkbox 215(a) or 215(b).

Once the user is satisfied with her privacy preference selections for this data element, then she clicks on the "OK" button 216 to confirm the selected directives and other preferences. Presumably she then performs essentially the same process for any other data elements shown in the Privacy Tools window 205, including without limitation, the selections associated with hypertext link 207(b), in turn establishing the access controls for fields 204(a) through 204(c). After completing this process for all of the elements she elects to control, she saves the redacted version of the document.

Turning next to FIG. 2B, in application window or browser screen 201 a redacted version 217 of electronic document 202 of FIG. 2A is shown. Redacted document 217 may incorporate redaction properties such as those specified in dialogue box 115 of FIG. 1-C. As shown therein, redaction labels appear in place of marked text fields. Thus, if viewed on a computer screen or printed by its recipient, the redacted document 217 may appear identical to a redacted document prepared using previously known redaction techniques.

However, as herein described, redacted document 217 includes a number of improved techniques which provide utility that is gained using previously known systems and methods. Persons of ordinary skill in the art will readily appreciate that if the holder of redacted document 217 properly authenticates himself in a manner acceptable to the person who created the privacy directives and is in fact allowed by the settings made in Privacy Properties dialogue box 208 of FIG. 2A to view or print the "Private Access Enabled" fields, then such fields would contain the same information as in the non-redacted form 202 of the document rather than appearing redacted. Similarly, if a time period of confidentiality were designated by the user who created the privacy directives for the document, and this period had elapsed at the time the electronic document is opened by the recipient, the controlled fields would appear in their non-redacted form.

FIG. 2-B illustrates the appearance in one illustrative embodiment of an electronic version of redacted document 217 by a recipient who is not entitled to access the redacted fields based on the settings made in the Privacy Properties dialogue box 208 of FIG. 2A. FIG. 2B illustrates that each of fields 218(a) through 218(d) are preferably able to display a highlighted area when a user rolls over any portion of the text with their mouse. Thus, as illustrated, in one illustrative embodiment of the invention, hovering over redaction label 218(a) with the users mouse causes the redacted area to be highlighted and for message 219 to appear on the user's screen. This message preferably indicates that the field is Private Access Enabled, and includes a unique data element identifier 220 and a link for the user to get more information about the access and control system, and depending on the privacy settings of the individual who set the privacy directives, means by which the user may apply to open the redacted field.

Similarly, hovering over redaction label 218(c) with the users mouse causes the redacted area to be highlighted and for message 221 to appear on the user's screen. This message preferably indicates that the field is Private Access Enabled, and includes a unique data element identifier 222 and a link as described above. Because redaction labels 218(b) and 218(d) have the same privileges as data label 218(c), these fields would operate in an identical manner in response to a rollover by the users mouse.

Additionally, FIG. 2-B illustrates that in one illustrative embodiment, the user may optionally be allowed to open tools window 223 by various means, including by clicking on a "Privacy Details" item from the toolbar in browser 201, or as an additional feature of a tools list or search results window when the invention is provided as an add-in utility or enhancement to an existing application such as Acrobat, MS Word or the like.

Messages 224(a) and 224(b) respectively indicate that the contents of tools window 223 are the elements of electronic document 217 that are Private Access Enabled, meaning that an individual has set access controls for these fields by defining data attributes as conditions for access to particular confidential data in the document. Thus as illustrated in FIG. 2-B, message 224(b) reveals that the document contains a total of four Private Access Enabled elements.

The detailed list located immediately below this notice in tools window 223 preferably indicates the Private Access enabled elements contained in document 217. In one illustrative embodiment, the list contains item 225, corresponding to item 218(a); and item 226, corresponding to items 218(b) through 218(d).

Item 225 preferably includes icon 225(a) to illustrate that according to the person who set the privacy and access controls for the redacted document, no access is permitted to this element. Item 225(b) indicates the unique element identifier, which is the same number as shown in dialogue box 219, and is used by the system to locate the privacy corresponding directives. Item 225(c) indicates the total number of elements in the document with this privacy preference. By clicking on the toggle to the immediate left of item 225, the user can preferably open the item to reveal additional useful details. Without limitation, depending on the user's privacy settings, these might include the date 225(d) on which the current preference was set, the date on which the current preference is due to expire (not shown); and 225(e), a definition for the meaning of the icon shown in 225(a).

Item 226 preferably includes similar information. For example, icon 226(a) is used to illustrate that according to the person who set the privacy and access controls for the redacted document, in this case selected access is permitted to this element based on rules, roles and identities. Item 226(b) indicates the unique element identifier, which is the same number as shown in dialogue box 220, and is used by the system to locate the privacy settings for this element. And item 226(c) indicates the total number of elements in the document with this privacy preference. By clicking on the toggle to the immediate left of item 226, the user can preferably open the item to reveal additional useful details 226(d) and 226(e) depending on the user's privacy settings.

Additionally, in the event that the individual opening the redacted document is the person who created the settings, the system preferably permits this user to access relevant information and to make changes in her privacy directives. This is illustrated by hypertext link 227(*a*) and 227(*b*), which respectively link to a notification history of other users who had sought access to this data element and the outcome thereof, and to the Privacy Properties dialogue box 208 shown in FIG. 2A, for editing the desired privacy preference directives. Persons of ordinary skill in the art will recognize that in a well-ordered system embodying the principles of the invention, the number of tools available and the specific items included in the detailed list located in tools window 223 can increase or decrease based on the needs and wishes of the owner of the system, and may change over time, and from time-to time.

FIG. 2C and FIG. 2D illustrate the appearance in one illustrative embodiment of an electronic version of redacted document 228 by an hypothetical recipient who is prohibited by the user's privacy preferences from seeing the element corresponding to item 225; but who based on the rules, roles and/or identities indicated in item 226(*e*) of FIG. 2-B by that user is allowed to see the three elements corresponding to item 226. Depending on the user's privacy preferences, the recipient may be granted view-only rights to the electronic document in this form, thereby requiring all printed versions of the document to be identical to redacted document 217 illustrated in FIG. 2-B. Persons of ordinary skill in the art will readily understand that permitting view-only rights to the document that is only partially redacted would result in increasing the protections against unauthorized access to the confidential portions of the document by persons looking at the printed document.

However, by viewing the electronic version of redacted document 228, the properly authenticated hypothetical recipient is able to view portions of the document that remain confidential for other non-authorized users. Thus, while field 218(*a*) and dialogue box 219 remain the same for this user as in FIG. 2B, the hypothetical recipient is able to view the original (e.g., non-redacted) text of fields 229(*a*) through 229(*c*) instead of the redacted appearance of fields 218(*b*) through 218(*d*) of FIG. 2B.

FIG. 2C also illustrates other optional features of one illustrative embodiment of the invention. As shown therein, tools window 223 includes optional hypertext links 230 and 231, respectively entitled "Request access to this element" and "Break the glass now". In one illustrative embodiment of the invention the presence of these links can be controlled by the user's General privacy settings on tab 209(*b*) of FIG. 2A. Thus, by clicking on link 230, the recipient is able to seek access to this portion of the redacted document by submitting a request to the user who controls the privacy settings for the document 202. Persons of ordinary skill in the art will recognize that this request can be sent to this person without revealing their identity to the hypothetical recipient who has been granted the ability to make such request for access. Thus, in one illustrative embodiment, this could be used to protect the name and contact information pertaining to the person who controls access to the document and only revealed if the reason for such contact is perceived as being compelling by them.

Hypertext link 231 reveals yet an additional optional feature of one illustrative embodiment of the system. In this case, the user who controls the privacy and access settings for the document has made provision for the recipient to "break the glass," which persons of ordinary skill in the art will recognize means to gain access based on the circumstances that a reasonable person would agree dictate the use of extraordinary rights (i.e., a medical emergency). In this instance, a well-ordered system would require the recipient to indicate the nature of the circumstance and to comply with any other procedure imposed by the user's privacy preferences and the rules of the institution in which this occurs.

Given the assumed additional rights invested in the hypothetical recipient of document 228, FIG. 2C includes check box 232 to dictates the appearance of fields 204(*a*) through 204(*c*) of FIG. 2A. As shown, check box 232 is unchecked in FIG. 2-C, resulting in these fields being unremarkable in 229(*a*) through 229(*c*); compared to the highlighting of fields 233(*a*) through 233(*c*) in response to check 234 in FIG. 2D. Additionally, FIGS. 2C and 2D include another optional hypertext link 235 in which the recipient is given the ability by the user to request the right to share the element corresponding to item 225 with one or more other persons.

In an illustrative embodiment, a system for authentication such as that described in U.S. Pat. No. 7,028,049 ('049 patent) which is incorporated herein by reference in its entirety, can be used in conjunction with the selective redaction methods described herein. A medical record may be selectively redacted wherein, upon receipt of a request for a record, the system of the '049 patent will initialize a workflow agent, represented by Approvals Agent, to seek the relevant approvals. In the event a patient had given prior approval, an indication of this would be on record in the system as a data item that as to any future request by any doctor or medical institution, there is the automatic pre-authorization by such patient for the release of his [confidential] medical data to such doctor or medical institution.

Alternatively, if express consent is required, the party whose approval is required in order to obtain the desired record or data will receive an automatically generated message from the Approvals Agent, indicating that a request has been made for the records selected by the requesting client. The notice will provide an icon for easy selection by the recipient to indicate his or her consent, or denial, of such provision together with means for authenticating his or her identity, all expressly applied by the data administrator. However, if a standing provision has been given by the party for release of their records in the specific circumstances fulfilled by the requester, then such approvals will be granted automatically."

When the Approvals Agent receives all of the required authorizations for release of the records request, it will automatically generate a message to the data administrator where these records are held notifying him of this fact and asking that he retrieve and transmit the documents to the requesting physician. This notification will also include a copy of the security log showing proof that all authorizations are complete; specify the requested mode of transmittal (e.g., mail, fax, overnight delivery or network transmission) and verify that all related charges are paid."

An optional enhancement in one illustrative embodiment of the system and method in which the patient's consent is evidenced through a radio frequency identification (RF ID) signal or its equivalent (including but not limited to any form of wireless device) that may be worn, held or otherwise present with the patient or other person for the purpose of controlling access to the document or some or all redacted portions thereof. Such RF, wireless or other device is worn by or accompanies the patient, for example. The strength of a signal generated by such a device may be variable and controllable by the user thereof for the maximum operable distance from an intended receiver. Illustratively, a limited area is capable of receiving such signal from device the device.

Persons of ordinary skill in the art will readily appreciate that when used in conjunction with the selectively-controlled redaction fields described in FIG. 2 hereof, such optional device provides a means by which a user can dictate that the only time any portion of a confidential document is visible is when the device on which he or a trusted associate are viewing it is within a prescribed difference. For example, many hospitals have hundreds of computer terminals and thousands of medical personnel with role based credentials to access patient records. However, a hospital wishing to assure confidentiality of the patient's records could cause all personally-identifiable fields of the medical record to only be viewed when the medical personnel are within several feet of the patient. This would assure that any medical personnel outside the immediate proximity of the patient would be prevented from viewing the contents of these redacted fields and, at the same time for example, any medical personnel entering the patient's room would have access to the complete record.

Similarly, in an out-patient context, the patient's records or selected portions thereof could only be viewed to the extent that the patient was in the doctor's office or otherwise received access through an affirmative response to link 230 described in connection with FIG. 2C. This is of particular relevance to recently-adopted laws that require any medical professional to not share with any third-party payer any portion of the patient's records for which the patient has paid out-of-pocket. The audit trail associated with such access would reflect that the permission was obtained through accessing the pre-authorized rights with the proximity device or express authorization record serving to indicate the patient's consent.

Although, as mentioned above, all of the features of the system are not required in order to practice the principles of the invention and thus some are optional, it is deemed apparent that each of the features illustrated in the accompanying drawings and the foregoing description are attractive and add to the usefulness of the invention. Thus, for example manual entry of privacy settings may be employed for some of the steps in lieu of a use of automated settings and pre-selected templates. Likewise, certain steps of a illustrative embodiment which employ automated entry, calculation and/or reporting, may be conducted by telephone, through manually written documents or semi-automatically though operation of the system processor and communication by modem, wired or wireless networking and the like.

Although the present invention is described with reference to electronic documents, persons having ordinary skill in the art should appreciate that the term "electronic documents" is not limited to any particular type of documents such as word processing documents, spreadsheets, presentation materials, medical records, databases. Rather the term "electronic documents" as used herein should be broadly interpreted to include virtually any type of electronic information that could contain information for selective redaction of information using one or more computer systems.

In an illustrative embodiment of the invention an "electronic document" may comprise all or part of a person's genome or other atomic or molecular structural information. A person using this embodiment may designate certain portions of his or her genomic information as private, other portions as public and certain portions as being authorized for viewing by designated individuals or under designated circumstances, for example. Such selective redaction of a person's genomic information may be appropriate when the information is associated with personal attributes or susceptibilities which could be the basis of discrimination against the person.

Although genomic information is referred to herein as an "electronic document" it should be understood that such information may never be embodied in a hard-copy and may typically be stored in a computer readable medium for interpreting or displaying by a computer device. Where such device may interpret or use genomic information or other electronic documents without requiring a display, the embodiments of the present invention may perform redaction by rendering redacted information inaccessible to such devices.

As will be evident to persons who are skilled in the art, a well-ordered system may provide for the foregoing steps at any number of points in its operation. Accordingly, although these process steps are shown in the drawings and accompanying written description at particular points, it should be understood that this is illustrative only and does not suggest that some or all of these steps may not take place at other points during operation of the system.

Additionally, although the disclosure hereof has been stated by way of example of illustrative embodiments, it will be evident that other adaptations and modifications may be employed without departing from the spirit and scope thereof. For example, although certain examples are provided with respect to healthcare, it is not the intention to limit the invention to such application. The terms and expressions employed herein have been used as terms of description and not of limitation; and thus, there is no intent of excluding equivalents, but on the contrary it is intended to cover any and all equivalents that may be employed without departing from the spirit and scope of this disclosure.

What is claimed is:

1. A computer implemented method for selective redaction of information in an electronic document by owner of said information, the method comprising the steps of:
   receiving a command by at least one computer from a redactor identifying at least one portion of an electronic document to be subject to access control;
   presenting, by said at least one computer, a set of selectable access control directives defining conditions for access to said at least one portion of said electronic document, said selectable access control directives selected and controlled by holder of privacy rights of said document, wherein said selectable access control directives are members of the group consisting of redact at least one portion of said electronic document, allow full access to said at least one portion of said electronic document, provide no-print access of said at least one portion of said electronic document, and query requester for additional information;
   receiving, from said redactor by said at least one computer, selected directives of said set of selectable access control directives;
   receiving, from said redactor by said at least one computer, changed selected directives of said set of selectable access control directives;
   changing said access control by said at least one computer in response to receiving said changed selected directives from said redactor; and
   imposing access control of said at least one portion of said electronic document by said at least one computer in accordance with said conditions in response to receiving said selective access control directives, wherein said conditions are members of the group consisting of access requester identity, access requester class and access request time.

2. The method of claim 1, wherein said steps of presenting a set of selectable access control directives comprises providing a privacy menu on a document viewing user interface.

3. The method of claim 2, wherein said step of receiving selective directives comprises receiving mouse clicks on said privacy menu which identifying selected directives.

4. The method of claim 2, further comprising:
   displaying, on a user interface display by said computer, said privacy menu in response to a redactor hovering a mouse over said at least one portion presented on a user interface display.

5. A system for selective redaction of information in an electronic document by owner of said information comprising:
   at least one computer configured to receive, from a redactor, changed selected directives of a set of selectable access control directives and change said access control in response to receiving said changed selected directives from said redactor;
   receive a command from a redactor identifying at least one portion of said electronic document to be subject to access control;
   present a set of selectable access control directives defining conditions for access to said at least one portion of said electronic document, said selectable access control directives, are members of the group consisting of redact at least one portion of said electronic document, allow full access to said at least one portion of said electronic document, provide no-print access of said at least one portion of said electronic document, and query requester for additional information and said selectable access control directives are controlled by holder of privacy rights of said document;
   receive selected directives of said set of selectable access control directives; and
   impose access control of said at least one portion of said electronic document in accordance with said conditions in response to receiving said selective access control directives, wherein said conditions are members of the group consisting of access requester identity, access requester class and access request time.

6. The system of claim 5, wherein said at least one computer is further configured to present a privacy menu on a document viewing user interface.

7. The system of claim 6, wherein said at least one computer is further configured to receive mouse clicks on said privacy menu which identifying selected directives.

* * * * *